Jan. 18, 1966     J. A. CUNNINGHAM     3,229,972

PIPE ENGAGING HEAD FOR LINE-UP CLAMP

Filed Sept. 25, 1962

INVENTOR.
Joseph A. Cunningham
BY
Hovey, Schmidt, Johnson & Hovey
ATTORNEYS.

United States Patent Office 3,229,972
Patented Jan. 18, 1966

3,229,972
PIPE ENGAGING HEAD FOR LINE-UP CLAMP
Joseph A. Cunningham, Tulsa, Okla., assignor to Crose-United Corporation, Tulsa, Okla., a corporation of Oklahoma
Filed Sept. 25, 1962, Ser. No. 226,094
12 Claims. (Cl. 269—48.1)

This invention relates to improvements in inside line-up pipe clamps and, more specifically, to an improved means for engaging the internal periphery of pipes during use to form and align such pipes in end-to-end, abutting relationship.

Inside line-up pipe clamps are used to hold pipe section in end-to-end, aligned, abutting relationship while their proximal ends are welded together. Such pipe clamps commonly employ circular rows of spaced plungers that are actuated in an outward, radial direction to solidly engage the pipes from within and hold them in proper relationship as well as form the pipe sections into cylindrical configurations having equal diameters at the joint to be welded.

Heretofore various devices and configurations have been used on the pipe-engaging faces of such plungers in an effort to properly distribute the applied force of the clamp and form the pipe into a uniform, cylindrical shape. Such plunger modifications, however, have not, for the most part, produced completely satisfactory results.

It is, therefore, the primary object of this invention to provide improved ends for such pipe-engaging plungers of line-up clamps that will effectively size the pipes and shape them into cylindrical configurations.

It is the most important object of the present invention to provide rocker heads for clamp plungers that will evenly distribute the applied force over the internal peripheries of the pipes and effectively hold them in proper end-to-end relationship.

It is still another very important object of the present invention to provide a limited rocker action for the plungers against the pipes while utilizing a minimum amount of space around the periphery of the clamp.

Figure 2:
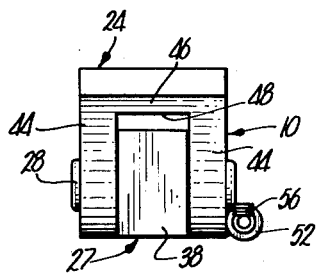
Figure 1:
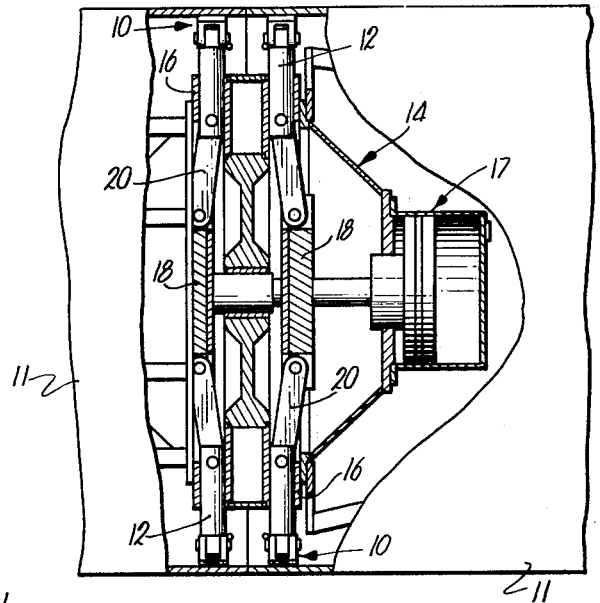
Figure 4:
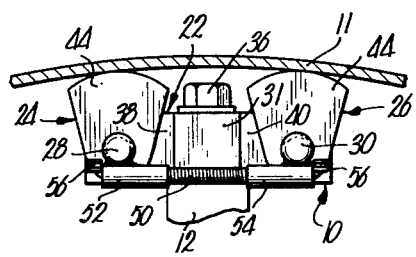
Figure 3:
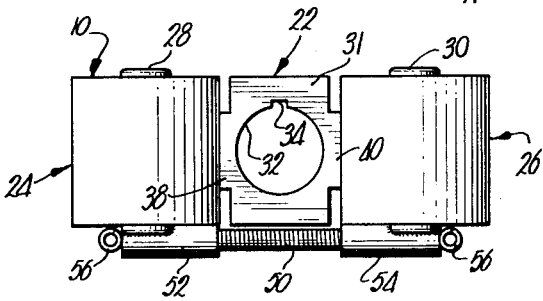
Figure 5:
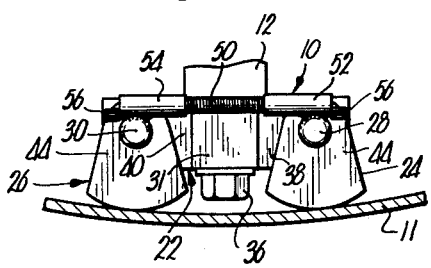
Figure 6:
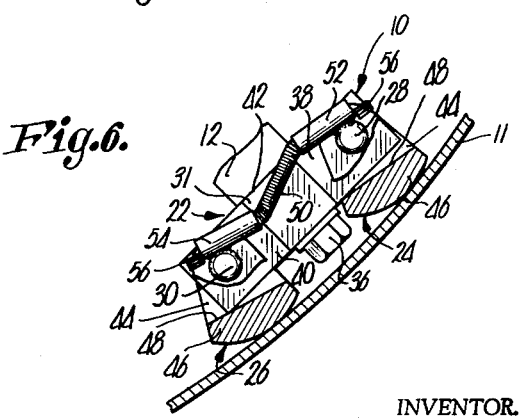

In the drawing:
FIGURE 1 is an elevational view of two pipe fragments in end-to-end, aligned, abutting relationship with the pipes broken away at the joint to show certain of the internal mechanism of the clamp, partially in section, with which the improvements of the present invention may be used;
FIG. 2 is an enlarged end view of the heads shown in FIG. 1;
FIG. 3 is a plan view of said head on the same scale as FIG. 2;
FIG. 4 is a side elevational view on a smaller scale than FIG. 1, showing the position of the head that is in engagement with the internal periphery of a pipe at the top of the latter;
FIG. 5 is a view similar to FIG. 4, showing the position of the head that engages the bottom of the pipe; and
FIG. 6 is a view similar to FIG. 4, but partially in section, showing the position of the head that engages the pipe above the bottom of the latter.

Referring to FIG. 1, the pipe-engaging heads 10 of the present invention are illustrated in engagement with a pair of pipes 11. The devices 10 are each mounted on a plunger 12 of an inside line-up pipe clamp generally designated 14.

The plungers 12 reciprocate radially within rings 16 and are pivotally connected to discs 18 by links 20, the discs 18 being shifted with respect to the rings 16 by pneumatic power means 17. Thus, rings 16, in conjunction with discs 18 and links 20, serve to operably support plungers 12 within pipes 11.

Each head 10 of the present invention includes a crossbar 22 having a pair of rockers 24 and 26 mounted thereon by parallel pintles 28 and 30 respectively. The crossbar 22 has an enlarged, central, polygonal boss 31 provided with a circular, plunger-receiving opening 32 and a way 34 for receiving a key to prevent it from rotating on the plunger 12. Bolts 36 rigidly secure the bosses 31 to the plungers 12 so that the longitudinal axes of the pintles 28 and 30 are held substantially parallel with the longitudinal axes of the pipes 11.

The boss 31 is provided with a pair of oppositely extending identical polygonal wings 38 and 40 integral with the boss 31 and of the same thickness as the latter in a direction radially of the plungers 12. It is to be noted, therefore, that the bolts 36 which pass through the openings 32 and into the outer ends of plungers 12, hold the inner faces of the bosses 31 tightly against outwardly facing shoulders 42 on the plungers 12, with the heads of bolts 36 disposed between the rockers 24 and 26. This means then that the plungers 12 may be fully retracted until the crossbars 22 strike the rings 16 and that the rockers 24 and 26 may engage the pipes 11 without interference by the heads of bolts 36. Accordingly, the heads 10 occupy a minimum amount of space between the peripheries of the rings 16 and the inner faces of the pipes 11, permitting the rocking action on the part of rockers 24 and 26 about their pintles 28 and 30, as hereinafter to be described.

The rockers 24 and 26 may be identical and, therefore, interchangeable. Each is substantially U-shaped presenting a pair of legs 44 and a bight 46 that integrally interconnects the legs 44.

The wings 38 and 40 are impaled by the legs 44 of the corresponding rockers 24 and 26 and it is contemplated that the pintles 28 and 30 pass entirely through the legs 44 and the wings 38–40. By way of example then, the pintles 28 and 30 may be welded or otherwise attached to at least one of the legs 44 for oscillatory movement within the wings 38 and 40.

The bights 46 are shown in FIG. 6 as provided with flat, innermost faces 48 normal to the inner faces of the legs 44 to the end that the extent of rocking of the rockers 24 and 26 is limited in both directions by the faces 48 striking the outer faces of the corresponding wings 38 and 40.

The outermost faces of the bights 46 on the other hand, are flat only in one direction, i.e. along axes parallel with the pintles 28 and 30 as seen in FIG. 3, but are convex transversely thereof in preferably concentric relationship to the axes of the pintles 28 and 30.

Rockers 24 and 26 are yieldably held in a normal position as illustrated in FIGS. 3, 4 and 5 by a spring 50 connected therewith. The manner of providing for such yieldable holding of the rockers 24 and 26 against movement about the pintles 28 and 30 may take the form of a pair of tubes 52 and 54 secured as by welding directly to one leg 44 of each rocker 24 and 26 respectively. Tubes 52 and 54 are disposed adjacent the pintles 28 and 30 near the free ends of the legs 44 to which they are attached with their longitudinal axes perpendicular to the axes of the pintles 28 and 30 and to this end, when the rockers 24 and 26 are in the normal position illustrated in FIG. 4, tubes 52 and 54 are in alignment.

The coil spring 50 passes loosely through the tubes 52 and 54 alongside the boss 31 adjacent the inner end of the latter and is held against displacement from the tubes 52 and 54 by merely bending certain of the outermost convolutions 56 of the spring 50 laterally at the outer ends of the tubes 52 and 54.

Inside line-up pipe clamps 14 are normally provided with wheels or rollers supporting them in the pipes 11 when the plungers 12 are contracted with the peripheries of the rings 16 spaced from the inner walls of the pipes 11. Such spacing is usually greater at the top of the pipes 11 than at the bottoms. For example, the spacing at the bottoms of the rings 16 may be only ½ in. with the spacings at the sides of the rings 16 approximately 1 in. and with 1½ in. space at the tops of the rings 16.

This means then that when the fluid piston and cylindrical assemblies 17 (only one of which is illustrated in FIG. 1) are actuated to force the discs 18 inwardly and, therefore, the plungers 12 radially outwardly through links 20, the heads 10 at the bottom of the clamp 14 will be the first to move into engagement with the pipes 11. Consequently, as seen in FIG. 5, the rockers 24 and 26 of such lowermost heads 10 will not change position, i.e. they will engage the pipes 11 without rocking in either direction and without flexing the spring 50. For the most part, the same will be true with respect to the rockers 24 and 26 of the head 10 at the top of the clamp 14, as seen in FIG. 4, notwithstanding the fact that these heads must travel farther than the heads at the bottom of the clamp 14 before they come into engagement with the pipes 11.

It can now be appreciated that as soon as the clamp 14 moves upwardly until it becomes centered in the pipes 11, i.e. until the spacing between the rings 16 and the pipes 11 is equalized around the entire peripheries of the rings 16, certain of the rockers 24 and 26 will be caused to rock as they move into engagement with the pipes 11. FIG. 6 of the drawings illustrates the maximum amount of rocking of the two rockers 24 and 26 of one of the heads 10, and on close inspection it appears that such maximum rocking takes place in the heads 10 that are disposed at about 45° upwardly in both directions from the bottom of the pipe.

As the two rockers 24 and 26, illustrated in FIG. 6, are moved against the proximal pipe 11 by the corresponding plunger 12, and as the entire clamp 14 moves upwardly within the pipes 11, as just above described, the tight frictional engagement of the outer surfaces of the bights 46 of such pair of rockers 24 and 26, with the pipes 11 causes such rockers 24 and 26 to rock in the same direction, i.e. downwardly toward the bottom of the pipes 11. Such rocking continues until the faces 48 engage the wings 38 and 40 and is permitted by the flexing of spring 50 causing the latter to take on a partial Z-shaped configuration. The tubes 52 and 54 move out of relative alignment because they swing in opposite directions and the spring 50 bends transversely at the inner ends of the tubes 52 and 54.

It can now also be appreciated that certain of the rockers 24 and 26 of the remaining heads 10 will likewise rock in much the same manner as illustrated in FIG. 6 but to a lesser extent; as a matter of fact, it appears as if there is very little rocking action in the rockers 24 and 26 of a majority of the heads 10 around the peripheries of the rings 16.

An important attribute of the instant invention, as above intimated, lies in the fact that the head 10 requires a minimum amount of space between the peripheries of the ring 16 and the walls of the pipes 11. This is partially because of the fact that a minimum action is required by the rockers 24 and 26; in fact, they are limited to a small swinging movement and are effectively restrained by the spring 50 against any movement whatsoever except as actuated when they engage the pipes 11 and when, at the same time the entire clamp 14 moves bodily toward a centralized position within the pipes 11.

One of the requirements of pipe-engaging heads for internal line-up clamps is the provision of a maximum amount of contact and such is herein provided because of the large area of the convex faces of the bights 46.

It is, therefore, possible through the construction illustrated and above described, to incorporate the rather large area in both directions on the convex faces of the bights 46. The distance across the outer faces of bights 46 from one leg 44 to the opposite leg 44 is many times greater than that heretofore made possible in pipe engaging heads of conventional clamps. By the same token, the construction of the instant invention as made it possible to provide a sufficient distance between the axes of the pintles 28 and 30 and the convex faces of the rockers 24 and 26 to assure the necessary amount of movement when the plungers 12 force the rockers 24 and 26 against the pipes 11.

This means then that because of the large area of contact between such convex faces and the pipes 11, the tendency to bulge or indent the pipes 11 at the zones of contact, is appreciably minimized. Such is not true in conventional pipe-engaging devices for they normally are made in a manner to result in either a short line contact or a substantial point contact which tends to damage the pipe from the standpoint of forming multitudes of discrete bumps or indentations.

Furthermore, the desired movement on the part of pipe-engaging heads is oftentimes lost because of slippage at the points of contact and because of the tendency of the heads to "freeze" after they have been in use for a short period of time. The slippage is caused primarily by such freezing as the result of rusting and other contamination.

The slipping problem is alleviated in the instant invention because of the greater area of contact as aforementioned, and because of the sufficiently large arc of swinging about the axes of pintles 28 and 30. The freezing problem is entirely eliminated because of the fact that the springs 50 are constantly acting on the rockers 24 and 26. After each operation which tends to cause some movement on the part of rockers 24 and 26, the springs 50 immediately take over and return the rockers 24 and 26 to a normal position as soon as the plungers 12 are released, thereby removing the tendency to freeze and breaking loose any locking or jamming that may take place because of corrosion or other adverse conditions.

Having thus described the invention, what is claimed as new and desired to be secured by Letters Patent is:

1. In an inside line-up pipe clamp, a plurality of plungers movable radially toward the pipe when the clamp is in the pipe; a plurality of pipe-engaging rockers; means mounting a pair of said rockers on each of said plungers for rocking movement of each rocker about an axis substantially parallel with the axis of the pipe when the clamp is therewithin; and biasing means coupled with said rockers for maintaining each rocker in a normal, outwardly facing position between the ends of its rocking path of travel.

2. In an inside line-up pipe clamp, a plurality of plungers movable radially toward the pipe when the clamp is in the pipe; a plurality of pipe-engaging rockers; means rockably mounting a pair of said rockers on each of said plungers; and resilient means coupled with said rockers and yieldably biasing each rocker toward a position midway of the ends of its rocking path of travel.

3. The invention of claim 1, and means limiting the extent of rocking movement of said rockers.

4. For an inside line-up pipe clamp, a pipe-engaging head comprising:
 a cross bar;
 a pair of rockers mounted on the crossbar for swinging movement toward and away from each other about parallel axes, and each provided with a normally outwardly facing, elongated face longitudinally parallel with said axes, each face being transversely arcuate; and
 means limiting the extent of swinging movement of the rockers.

5. The invention of claim 4, and resilient means coupled with the rockers yieldably biasing the same toward a position intermediate the ends of their paths of travel.

6. The invention of claim 5, each rocker having a tube fixed thereto, said resilient means comprising a spring extending through the tubes and adapted to flex during swinging of the rockers.

7. A pipe-engaging head for internal line-up pipe clamps comprising:
   a support;
   a pair of rockers each having an arcuate, pipe-engaging face;
   means mounting each rocker on the support for oscillatory movement about an axis spaced from said face thereof; and
   means yieldably holding the rockers against oscillatory movement.

8. The invention of claim 7, the axes of the rockers being parallel for movement of the rockers in a direction toward and away from each other.

9. The invention of claim 8, said faces being concentric with corresponding axes.

10. The invention of claim 9, and means on the support disposed for engagement by the rockers to limit the extent of oscillatory movement of the latter.

11. In combination with an internal line-up pipe clamp having a plunger support and a circular series of plungers carried by the support and movable radially outwardly toward the pipe when the clamp is in the pipe, a head on the outer end of each plunger respectively and disposed entirely between the pipe and said support, said heads each comprising:
   a pair of rockers mounted for oscillation about axes disposed between the support and the pipe and extending substantially axially of the pipe;
   said rockers each having a pipe-engaging surface spaced outwardly from its axis;
   opposed blocking means engageable with each of said rockers for limiting the extent of oscillation thereof; and
   biasing means coupled with said rockers for maintaining each rocker in a normal, outwardly facing position between the limits of its oscillatory path of travel.

12. In combination with an internal line-up pipe clamp having a plunger support and a circular series of plungers carried by the support and movable radially outwardly toward the pipe when the clamp is in the pipe, a head on the outer end of each plunger respectively and disposed entirely between the pipe and said support, said heads each comprising:
   a pair of rockers mounted for oscillation about axes disposed between the support and the pipe and extending substantially axially of the pipe;
   said rockers each having an arcuate pipe-engaging surface spaced outwardly from and concentric to its axis;
   opposed blocking means engageable with each of said rockers for limiting the extent of oscillation of the rockers for movement of said surfaces along paths of travel within arcuate planes confined to the space between the pipe and the support and disposed entirely radially outwardly of said plungers; and
   biasing means coupled with said rockers for maintaining each rocker in a normal, outwardly facing position between the limits of its oscillatory path of travel.

References Cited by the Examiner
UNITED STATES PATENTS

| | | | |
|---|---|---|---|
| 2,615,413 | 10/1952 | Adams et al. | 113—103 |
| 2,830,551 | 4/1958 | Miller | 113—103 |
| 3,044,431 | 7/1962 | Cummings | 113—103 |

WHITMORE A. WILTZ, *Primary Examiner.*

CHARLES W. LANHAM, *Examiner.*